United States Patent
Jankovic et al.

(10) Patent No.: US 11,327,496 B2
(45) Date of Patent: May 10, 2022

(54) VEHICLE PATH IDENTIFICATION

(71) Applicant: Ford Global Technologies, LLC, Dearborn, MI (US)

(72) Inventors: Mrdjan J. Jankovic, Birmingham, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 16/249,326

(22) Filed: Jan. 16, 2019

(65) Prior Publication Data

US 2020/0225670 A1    Jul. 16, 2020

(51) Int. Cl.
| | | |
|---|---|---|
| *G05D 1/02* | (2020.01) | |
| *B60W 30/095* | (2012.01) | |
| *B60W 50/00* | (2006.01) | |

(52) U.S. Cl.
CPC ......... *G05D 1/0214* (2013.01); *G05D 1/0223* (2013.01); *B60W 30/0956* (2013.01); *B60W 50/00* (2013.01); *B60W 2050/0052* (2013.01); *B60W 2554/00* (2020.02); *B60W 2720/10* (2013.01); *G05D 2201/0213* (2013.01)

(58) Field of Classification Search
CPC ........ G05D 1/02–1/297; G05D 1/0214; G05D 1/0223; G05D 2201/0213; B60W 2554/00; B60W 2720/10; B60W 2050/0052; B60W 50/00; B60W 30/0956; B60W 60/0011; G08G 1/166; G08G 1/167; G08G 1/096805
See application file for complete search history.

(56) References Cited

U.S. PATENT DOCUMENTS

| | | | |
|---|---|---|---|
| 9,568,915 B1 | 2/2017 | Berntorp et al. | |
| 9,964,952 B1 | 5/2018 | Costa et al. | |
| 10,671,076 B1* | 6/2020 | Kobilarov | G08G 1/00 |
| 2009/0043474 A1* | 2/2009 | Nakai | B60W 30/143 |
| | | | 701/70 |
| 2012/0025964 A1* | 2/2012 | Beggs | B60Q 1/26 |
| | | | 340/435 |

(Continued)

FOREIGN PATENT DOCUMENTS

WO    2017197170 A1    11/2017

OTHER PUBLICATIONS

Bonmann, et. al., "Control Barrier Certificates for Safe Swarm Behavior", IFAC PapersOnLine 48-27 (2015), pp. 68-73 (6 pages).
Hassan, et. al., "A Fully-Distributed Heuristic Algorithm for Control of Autonomous Vehicle Movements at Isolated Intersections", International Journal of Transportation Science and Technology, vol. 3, No. 4 (2014), pp. 297-310 (13 pages).

(Continued)

*Primary Examiner* — James J Lee
*Assistant Examiner* — Alexander George Matta
(74) *Attorney, Agent, or Firm* — Frank A. MacKenzie; Bejin Bieneman PLC

(57) ABSTRACT

A planned acceleration of a vehicle and a predicted optimal acceleration of a target is determined. Upon determining that an actual acceleration of the target differs from the predicted optimal acceleration, the planned acceleration of the vehicle is revised based on the actual acceleration of the target. The foregoing steps can be implemented by a vehicle computer according to program instructions stored in a memory of the vehicle computer. The vehicle can include sensors, actuators, and/or controllers in communication with the computer via a vehicle communication network.

11 Claims, 6 Drawing Sheets

(56) References Cited

U.S. PATENT DOCUMENTS

| | | | |
|---|---|---|---|
| 2017/0315549 A1* | 11/2017 | Oppolzer | G05D 1/0044 |
| 2017/0345308 A1 | 11/2017 | Buburuzan et al. | |
| 2017/0372618 A1* | 12/2017 | Xu | G08G 5/0013 |
| 2018/0004213 A1* | 1/2018 | Absmeier | B60W 10/18 |
| 2018/0056998 A1 | 3/2018 | Benosman et al. | |
| 2018/0074505 A1 | 3/2018 | Lv et al. | |
| 2018/0150081 A1 | 5/2018 | Gross et al. | |
| 2018/0364787 A1* | 12/2018 | Fukumoto | G01C 21/20 |
| 2019/0025851 A1* | 1/2019 | Ebrahimi Afrouzi | B25J 9/0003 |
| 2019/0049968 A1* | 2/2019 | Dean | G05D 1/0088 |
| 2020/0117200 A1* | 4/2020 | Akella | B60W 60/0011 |
| 2020/0117206 A1* | 4/2020 | Egnor | G05D 1/0223 |

OTHER PUBLICATIONS

Kim, et. al., "Game Theory Based Autonomous Vehicles Operation", International Journal of Vehicle Design (IJVD), vol. 65, No. 4 (2014) (24 pages).

Trautman, et. al., "Unfreezing the Robot: Navigation in Dense, Interacting Crowds", IEEE/RSJ International Conference on Intelligent Robots and Systems (2010) (7 pages).

Xiangru Xu, "Constrained Control of Input-Output Linearizable Systems Using Control Sharing Barrier Functions", Department of Electrical Engineering and Computer Science, University of Michigan, Ann Arbor, MI (2017) (7 pages).

Snape, et. al., "The Hybrid Reciprocal Velocity Obstacle", IEEE Transactions on Robotics, vol. 27, No. 4 (Aug. 2011) (pp. 696-706.

* cited by examiner

VEHICLE PATH IDENTIFICATION

BACKGROUND

Computers can operate autonomous (or self-driving) vehicles. Other vehicles, both moving and non-moving, as well as other moving and/or non-moving objects, e.g., a bicycle, a pedestrian, etc., may be present in an area where an autonomous vehicle operates. It is a problem for a computer to plan a path for an autonomous vehicle, especially when needing to take into account possible paths of other moving objects. For example, it is a problem to operate an autonomous vehicle in a manner that avoids collisions or near-collisions, e.g., with other vehicles.

DETAILED DESCRIPTION

Introduction

Figure 1:
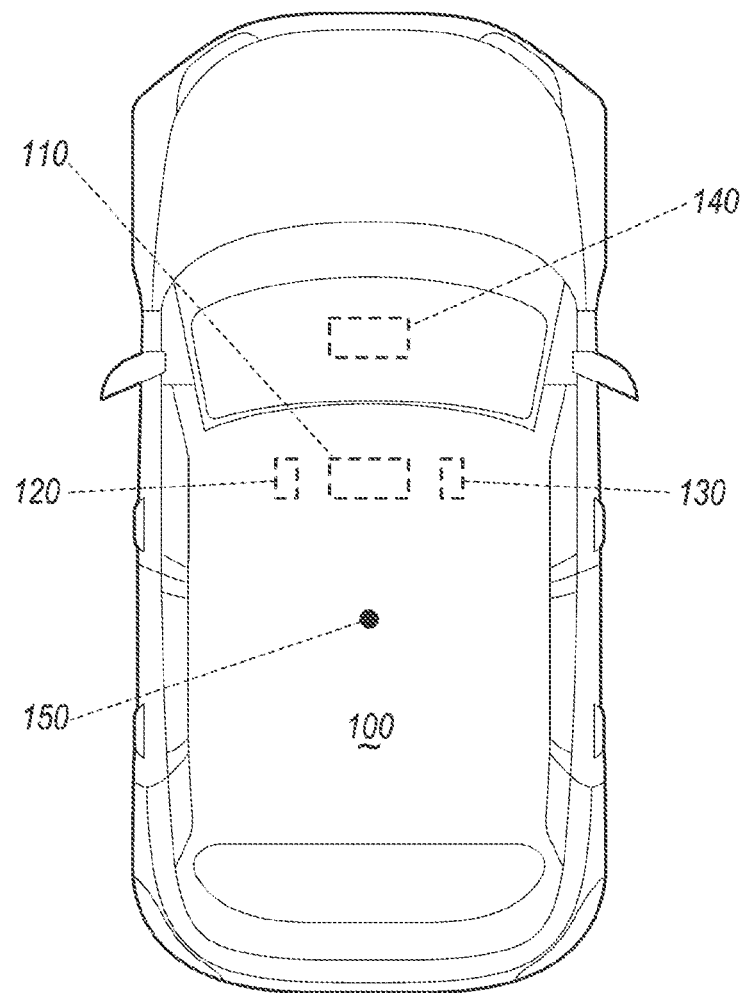
FIG. 1 is a diagram illustrating an example vehicle.

Disclosed herein is a method comprising determining a planned acceleration of a vehicle and a predicted optimal acceleration of a target, and upon determining that an actual acceleration of the target differs from the predicted optimal acceleration, revising the planned acceleration of the vehicle based on the actual acceleration of the target.

The target may be a pedestrian or a second vehicle.

The planned acceleration and predicted optimal acceleration each may include at least one of a direction and a physical magnitude.

Determining the planned acceleration and the predicted optimal acceleration may be based on the target being cooperative with the vehicle.

The method may further comprise adjusting a threshold based on a difference between the actual acceleration of the target and the predicted optimal acceleration, and adjusting the planned acceleration based at least in part on the adjusted threshold.

The method may further comprise determining a norm of the difference between the actual acceleration of the target and the predicted optimal acceleration, applying a filter to the norm to obtain a filtered norm, the filter having a first time constant in an increasing direction and a second time constant, greater than the first time constant, in a decreasing direction, and determining the adjusted threshold to be a scaled value of the filtered norm.

The threshold may be a circle centered at a reference point of the target with a specified safety radius.

The threshold may further include a second circle centered along a longitudinal axis of the target.

Revising the planned acceleration may further include determining an acceleration difference between the actual acceleration of the target and the predicted optimal acceleration.

The method may further comprise detecting a second target, predicting a second target acceleration, and based on (i) the actual acceleration of the target relative to the predicted target acceleration, (ii) a second target actual acceleration relative to the predicted second target acceleration, (iii) a threshold around the target, and (iv) a second threshold around the second target, adjusting the planned acceleration.

Further disclosed is a system comprising a processor and a memory, the memory storing instructions executable by the processor to determine a planned acceleration of a vehicle and a predicted optimal acceleration of a target, and upon determining that an actual acceleration of the target differs from the predicted optimal acceleration, revise the planned acceleration of the vehicle based on the actual acceleration of the target.

The target may be a pedestrian or a second vehicle.

The planned acceleration and predicted optimal acceleration each may include at least one of a direction and a physical magnitude.

The instructions may include further instructions to adjust a threshold based on a difference between the actual acceleration of the target and the predicted optimal acceleration, and adjust the planned acceleration based at least in part on the adjusted threshold.

The instructions may include further instructions to determine a norm of the difference between the actual acceleration of the target and the predicted optimal acceleration, apply a filter to the norm to obtain a filtered norm, the filter having a first time constant in an increasing direction and a second time constant, greater than the first time constant, in a decreasing direction, and determine the adjusted threshold to be a scaled value of the filtered norm.

The threshold may be a circle centered at a reference point of the target with a specified safety radius.

The instructions to revise the planned acceleration may further include instructions to determine a difference between the actual acceleration of the target and the predicted optimal acceleration.

The instructions may include further instructions to detect a second target, predict a second target acceleration, and based on (i) the actual acceleration of the target relative to the predicted target acceleration, (ii) a second target actual acceleration relative to the predicted second target acceleration, (iii) a threshold around the target, and (iv) a second threshold around the second target, adjust the planned acceleration.

Further disclosed herein is a system comprising means for determining a planned acceleration of a vehicle and a predicted optimal acceleration of a target, and means for revising the planned acceleration of the vehicle based on the actual acceleration of the target upon determining that an actual acceleration of the target differs from the predicted optimal acceleration.

Further disclosed is a computing device programmed to execute any of the above method steps.

Yet further disclosed is a computer program product, comprising a computer readable medium storing instructions executable by a computer processor, to execute any of the above method steps.

Exemplary System Elements

A vehicle computer can plan a vehicle path to be taken based on a variety of factors; these can include a path taken by other traffic objects, e.g., vehicles, bicycles, pedestrians, etc. Further, paths taken by other traffic objects may in turn depend on how the vehicle adjusts its path while moving toward a destination. Example scenarios include navigating a vehicle in a parking lot, a roundabout, a construction zone, etc., and/or when autonomously and non-autonomously operated vehicles are operating in an area. To address problems arising in planning and executing a path for autonomous vehicles, the present disclosure relates to determining a planned acceleration of the host vehicle and a predicted, jointly-optimal acceleration of a target object, and, upon determining that an actual acceleration of the target differs from the predicted optimal acceleration, revising the planned acceleration of the vehicle based on the actual acceleration of the target. In one example, as a result of adjusting vehicle acceleration (or revising the planned acceleration), a vehicle path may be adjusted. Alternatively, as a result of adjusting the vehicle acceleration the vehicle may traverse a same path although with different speed.

FIG. 1 illustrates an example vehicle 100. The vehicle 100 may be powered in a variety of known ways, e.g., with an electric motor and/or internal combustion engine. The vehicle 100 may be a land vehicle such as a car, truck, etc., and/or a robot such as drone. A vehicle 100 may include a computer 110, actuator(s) 120, sensor(s) 130, and a human machine interface (HMI 140). A vehicle 100 has a reference point 150, i.e., a specified point within the space defined by a vehicle body, e.g., a geometrical center point at which respective longitudinal and lateral center axes of the vehicle 100 intersect.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and/or steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to (e.g., via a vehicle 100 communications bus as described further below) more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a wireless vehicular communication interface with other traffic objects (e.g., vehicles, infrastructure, pedestrian, etc.), e.g., via a vehicle-to-vehicle communication network and/or a vehicle-to-infrastructure communication network. The vehicular communication network represents one or more mechanisms by which the computers 110 of vehicles 100 may communicate with other traffic objects, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary vehicular communication networks include cellular, Bluetooth®, IEEE 802.11, dedicated short range communications (DSRC), and/or wide area networks (WAN), including the Internet, providing data communication services.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of the vehicles 100. The computer 110 may be programmed to actuate the vehicle 100 actuators 120 including propulsion, steering, and/or braking actuators 120 based on the planned acceleration.

The sensors 130 may include a variety of devices known to provide data to the computer 110. For example, the sensors 130 may include object detection sensors 130 such as Light Detection And Ranging (LIDAR) sensor(s) 130 disposed on a top of the vehicle 100 that provide relative locations, sizes, and shapes of one or more targets 200 surrounding the vehicle 100, e.g., second vehicles, bicycles, pedestrians, robots, drones, etc., travelling next to, ahead, or behind of the vehicle 100 (see FIGS. 2A-2C). As another example, one or more radar sensors 130 fixed to vehicle 100 bumpers may provide locations of the target(s) 200 relative to the location of the vehicle 100.

The object detection sensors 130 may include camera sensor(s) 130, e.g. to provide a front view, side view, etc., providing images from an area surrounding the vehicle 100. For example, the computer 110 may be programmed to receive image data from a camera sensor(s) 130 and to implement image processing techniques to detect a road, infrastructure elements, etc. The computer 110 may be further programmed to determine a current vehicle 100 location based on location coordinates, e.g., GPS coordinates, received from a vehicle 100 location (e.g., GPS) sensor 130.

The HMI 140 may be configured to receive information from a user, such as a human operator, during operation of the vehicle 100. Moreover, a HMI 140 may be configured to present information to the user. Thus, a HMI 140 may be located in the passenger compartment of the vehicle 100. In one example, the computer 110 may be programmed to receive destination data, e.g., location coordinates, from the HMI 140.

Figure 2A:
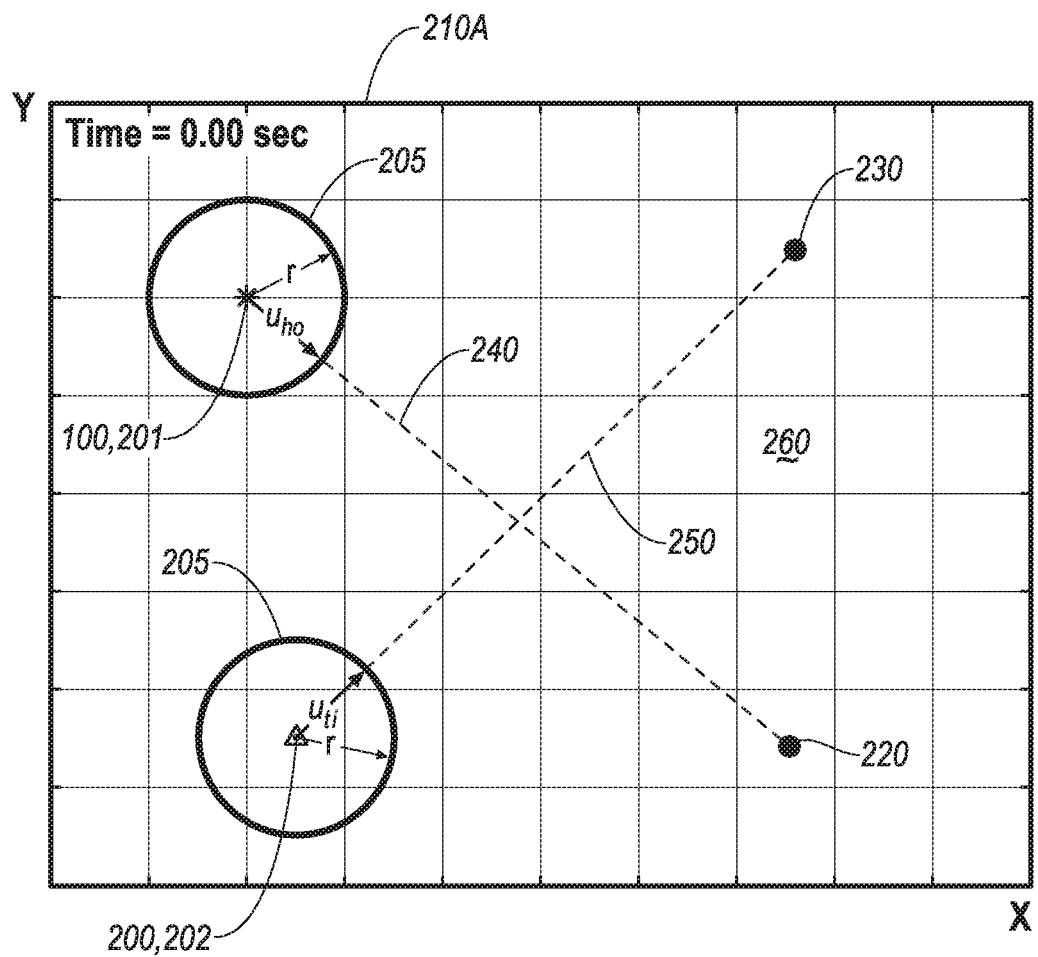
FIG. 2A is a plot showing the vehicle of FIG. 1 and a target traffic object in an area at a first time.
Figure 2B:
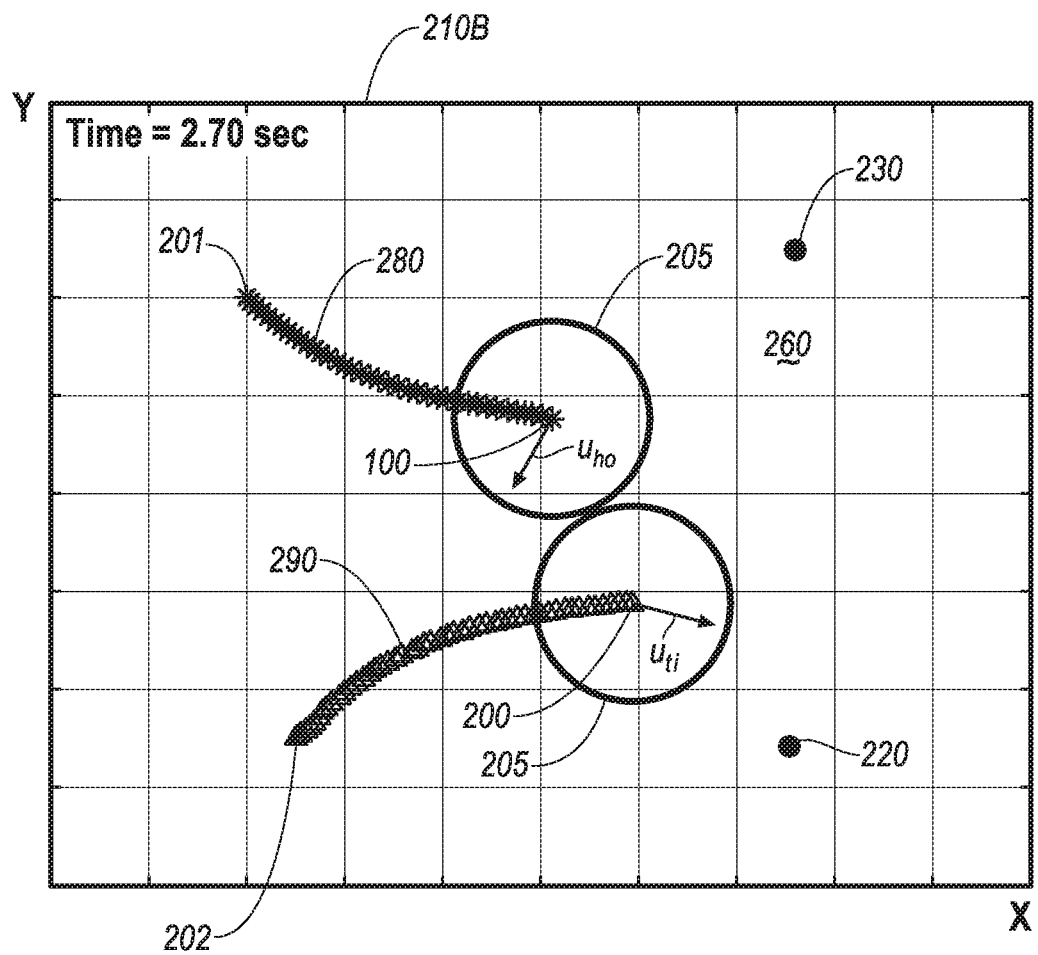
FIG. 2B is a movement plot showing the vehicle and the target at a second time.
Figure 2C:
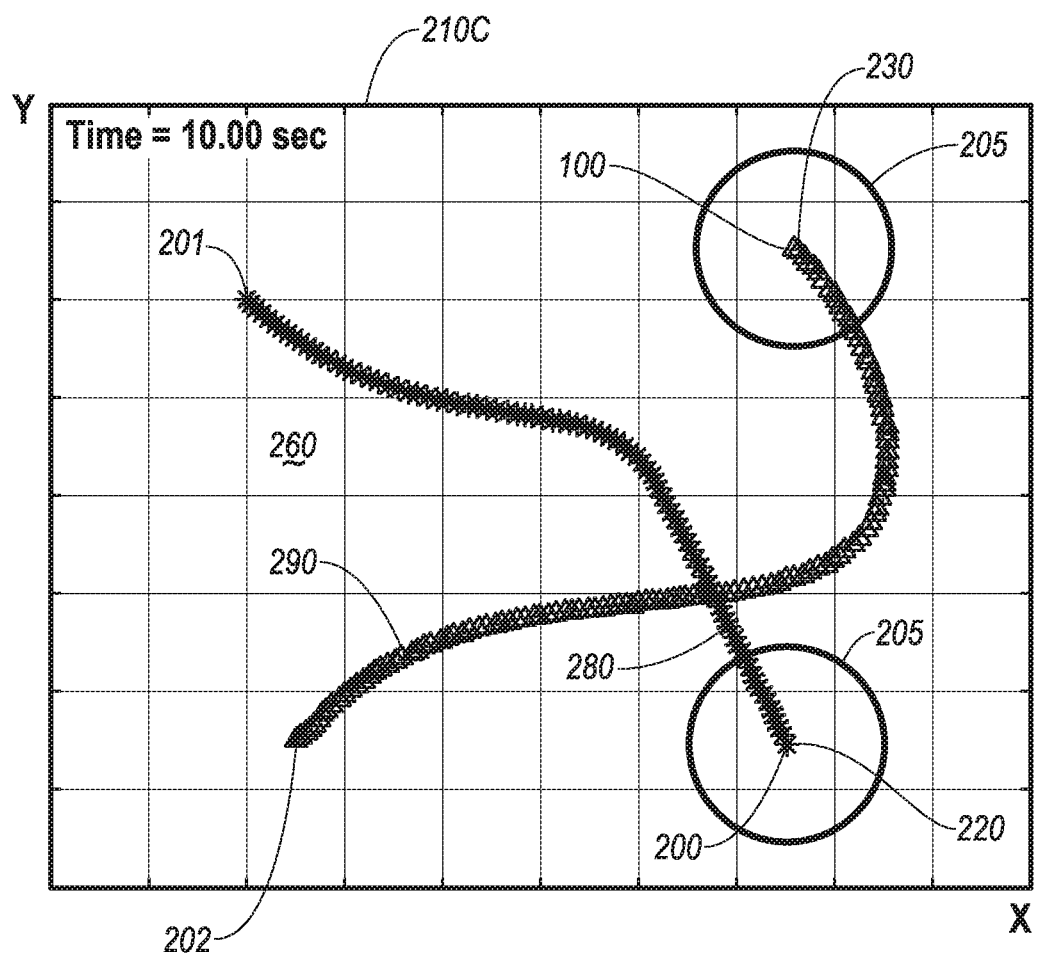
FIG. 2C is a movement plot showing the vehicle at respective destinations.

FIGS. 2A-2C show movement plots 210A, 210B, 210C for the vehicle 100 and a target 200, e.g., a second vehicle, a pedestrian, etc., within an area 260, while the vehicle 100 and the target 200 are respectively moving from respective points of origin 201, 202 to respective destinations 220, 230. The destinations 220 and 230 may represent interim destinations towards some farther-out final destinations. Location coordinates of a final destination 220, 230, e.g., office, home, school, etc. (or destination 220, 230), may be received from the HMI 140, a remote computer, an on-board path planner, etc. The plot 210A shows the vehicle 100 and target 200 at a time zero, i.e., no time has elapsed, i.e., the vehicle 100 and target 200 have not yet moved at all along the paths 240, 250 that may change as the vehicle 100 and the target 200 move toward the respective destinations 220, 230. The paths 240, 250, in the present context, may be referred to as "obstacle-free" paths 240, 250, because the vehicle 100 and/or the target 200 may traverse a shortest path to destination in absence of any obstacle that causes a change in the respective path 240, 250. FIG. 2A shows a planned obstacle-free acceleration $u_{h0}$ of the vehicle 100 and an optimal acceleration $u_{ti}$ of the target 200 at the time zero. As discussed below, an acceleration $u_{ti}$ may represent an acceleration of an $i^{th}$ target 200 from a set $t_1, \ldots, t_n$ of targets 200. The vehicle 100 and the target 200 are depicted as a point, which may represent a location of a reference point 150 or the like of the vehicle 100 and the target 200.

The plot 210B of FIG. 2B shows the vehicle 100 and target 200 at a time 2.7 seconds, i.e., 2.7 seconds has elapsed since the vehicle 100 and target 200 began moving from their respective points of origin 201, 202. As shown in FIG. 2B, actual paths 280, 290 of the vehicle 100 and target 200 may differ from the obstacle-free paths 240, 250 as a result of revising accelerations $u_{h0}$, $u_{ti}$, e.g., to avoid a collision.

The plot 210C shows the vehicle 100 and target 200 at a time ten seconds, i.e., ten seconds has elapsed since the vehicle 100 and target 200 began moving from their respective points of origin 201, 202. The plot 210C depicts actual paths 280, 290 from the original locations 201, 202 to the destinations 220, 230 as a result of revising the accelerations $u_{h0}$, $u_{ti}$ as the vehicle 100 and the target 200 moved to the destinations 220, 230.

An area 260, in the present context, means a portion of ground surface, e.g., a two-dimensional (2D) area on the surface of the earth. Thus, the X and Y axes in the plots 210 represent directions in two dimensions on the surface of the earth. Boundaries or edges of an area 260 may be defined by global positioning system (GPS) coordinates, e.g., as vertices of a triangular or rectangular area, a center of a circular area, etc. An area 260 may have any dimensions and/or shape, e.g., rectangular, oval, circular, irregular shape, etc. An area 260 may include a section of a road, an intersection, etc. An area 260 may be defined by a detection range of a sensor 130, i.e., locations within a predetermined distance, e.g., 200 meters (m), from the sensor 130.

In addition to vehicle 100, target(s) 200 such as other vehicles, pedestrians, bicycles, etc. may be present in the area. The locations of the vehicle 100 and the target(s) 200, in the present context, may be specified in a two-dimensional Cartesian coordinate system, e.g., having X, Y axes, as shown in FIGS. 2A-2C. As another example, the location coordinates of the vehicle 100 and/or the targets 200 may be GPS location coordinates.

The computer 110 may navigate the vehicle 100 to the final destination 220, e.g., based on data received from the HMI 140. For example, the received data may include GPS location coordinates of a destination 220 specified according to user input. In another example, the destination 220 may be determined by the computer 110 based on data received from the vehicle 100 sensors 130, e.g., a location of an available parking spot in a parking structure determined based on camera sensor 130 data, received data from a remote computer, etc. In contrast, the computer 110 may not be provided with data specifying location coordinates of the target 200 final destination 230.

The vehicle 100 computer 110 can be programmed to determine a planned acceleration $u_h$ of the vehicle 100 and a predicted optimal acceleration $u_{ti}$ of the target 200. The computer 110 can be programmed to, upon determining that an actual acceleration $a_{ti}$ of the target 200 differs from the predicted optimal acceleration $u_{ti}$, revise the vehicle 100 acceleration $u_h$ based at least in part on the actual acceleration $a_{ti}$ of the target 200.

A vehicle can operate on a roadway by determining a path polynomial to traverse a vehicle path. A computing device can determine a path polynomial including path coefficients based on vehicle sensor data and/or vehicle path information received from an infrastructure element 140 and/or a cloud-based server computer 170 via the network 135.

In the present context, a path 240, 280, 250, 290 is a straight or curved line that describes successive locations (i.e., locations at different times) of an object, e.g., a vehicle 100, a target 200, etc., on a two-dimensional (2D) plane parallel to the surface of a roadway upon which the object moves.

In the present context, an optimal acceleration $u_{ti}$ is a path that a target 200 takes such that the target 200 as a traffic object is cooperative with other traffic objects, e.g., the vehicle 100. In other words, the vehicle 100 computer 110 may receive sensor 130 data such as a location, speed, acceleration, direction, etc., of the target 200, and may estimate the optimal acceleration $u_{ti}$ of the target 200 from the current location based on the received sensor 130 data and an anticipated cooperation of the target 200. In the present context, "cooperation" of a target 200 (i.e., that the target 200 is "cooperative") means that the target 200 will optimize its acceleration $u_{ti}$ to move to a respective destination 230 while typically satisfying one or more specified rules. Cooperation is typically evaluated independently from whether a target 200 is operated autonomously or non-autonomously. Table 1 shows an example set of rules that can be used to obtain an anticipated cooperation of a traffic object, e.g., the target 200.

TABLE 1

| Rule | Description |
| --- | --- |
| Traffic restrictions | A target is expected to obey traffic restrictions such as driving within a driving lane, having a speed within a specified speed limit, give way to other traffic objects based on traffic laws, etc. For example, traffic laws may specify a minimum distance that a traffic object may need to maintain from other traffic objects. |
| Maneuver restrictions | A target is expected to determine a path to prevent a collision with other targets, e.g., the vehicle. |
| Lane change restriction | A target may change lane with an acceleration less than a specified threshold. |
| Optimized path determination | A target plans a route that is optimal for navigating to a target, typically a shortest path subject to constraints, e.g., avoiding collisions with obstacles, other road users, even if it has the right of way. |

In the present context, "revising" the planned acceleration $u_h$ may include determining a difference between the actual acceleration $a_{ti}$ of the target 200 and the predicted optimal acceleration $u_{ti}$. Revising an acceleration $u_h$ may include (i) changing a direction of the planned acceleration $u_h$, and/or (ii) changing a physical magnitude (e.g., 0.2 meter/second$^2$) thereof. For example, as a result of revising the acceleration $u_h$, the vehicle 100 may stay on a same curved line representing the path 240 but changing an acceleration of the vehicle 100 while traversing the path 240 of the vehicle 100. In another example, as a result of revising the acceleration $u_h$, the vehicle 100 actual path 280 may be a different line or curve compare to the line or curve representing the planned path 240 and/or having same or different physical magnitudes of acceleration.

With reference to example rules of Table 1, the vehicle 100 and/or a target 200 may maintain a minimum distance, e.g., specified as a distance threshold 205, to each other and/or to other traffic objects. The threshold 205 may be defined as a safety radius r of a circular area centered at a reference point 150 of the target 200. Additionally or alternatively, a threshold 205 for a long object, e.g., a truck, may include multiple circular thresholds 205 next to one another along a longitudinal axis of the long object, e.g., a longitudinal axis of the truck. As another example, a threshold 205 may be represented by a rectangle. The threshold 205 may vary based on measurements such as a speed, acceleration, heading, etc., of the target 200, as discussed below. A threshold 205 is typically measured from a point on a target 200, i.e., an area defining a threshold 205 can move with the respective target 200. In other words, the threshold 205 is defined based on a current location of the target 200 and/or vehicle 100.

FIGS. 2A-2C illustrate only one target 200, but multiple targets 200 may be in an area 260. The computer 110 may be programmed to detect a second target 200 and to predict a second target 200 path 250. The computer 110 can be further programmed to adjust the planned acceleration $u_h$ based on (i) the actual acceleration $a_{t1}$ of the target 200 relative to the predicted target acceleration $u_{t1}$, (ii) a second target 200 actual acceleration $a_{t1}$ relative to the predicted second target acceleration $u_{t1}$, (iii) the threshold 205 for the target 200, and (iv) a second threshold 205 for the second target 200. The computer 110 may include programming to calculate for the jointly optimal motion for the vehicle 100 and the targets 200, e.g., accounting for rules listed in Table 1. For example, the computer 110 in the host vehicle 100 may adjust its motion by accounting for a maneuver one target 200 has to perform to avoid colliding with another target 200, as well as with the host vehicle 100. This may be done in a way that requires minimal departure from the current trajectories, or minimal accelerations/decelerations, by all participants (vehicle 100 and target(s) 200) hence, in a jointly optimal way.

Table 2 provides definitions of parameters included in Equation (1), which describes how multiple traffic objects including the vehicle 100 and one or more targets 200 maintain a minimum threshold distance 205 from one another of $(1+\mu_j)r$. In the present context, $(1+\mu_j)r$ is a scaled value for the threshold 205 associated with the target $t_j$ (i.e., a radius value scaled based on the determined factor $\mu_j$). In other words, the premise of Equation (1) is that each of a set $t_1 \ldots t_n$ of targets 200 will follow a path 290 while maintaining a distance $d_{ij}$ from the host vehicle 100 and each of the targets as the host vehicle to other targets 200-$i$ in the set $t_1 \ldots t_n$. Thus, a distance $d_{ij}$ is a distance predicted to be maintained between each of two objects i and j minus the threshold 205, where the object i and the object j are different objects, and where $d_{ij}$ is greater than 0 (zero).

$$d_{ij}=(x_i-x_j)^2+(y_i-y_j)^2-(1+\mu_j)^2r^2 \geq 0, i \in \{h,t_1, \ldots t_n\}, j \in \{t_1, \ldots t_n\} i \neq j \qquad (1)$$

TABLE 2

| Parameter | Definition |
|---|---|
| $t_1 \ldots t_n$ | Target objects such as vehicles, drones, pedestrians, bicycles, etc. (n is the number of targets). |
| h | Host vehicle. |
| $x_i, y_i$ | x, y coordinate of $i^{th}$ traffic object. |
| $x_j, y_j$ | x, y coordinate of $j^{th}$ traffic object. |
| $\mu_j$ | Safety margin factor for a $j^{th}$ target. |
| $d_{ij}$ | Object-to-object predicted distance defined based on equation (1). |

The factor $\mu_j$ may be 0 (zero), i.e., a same threshold distance r may be specified for all targets $t_1 \ldots t_n$, or r may vary based on type of target (e.g., truck, passenger car, pedestrian, etc.), and/or physical magnitudes such as speed, acceleration, etc. of each target 200 $t_1 \ldots t_n$. For example, the computer 110 may be programmed to determine a factor $\mu_j$ based on a table stored in a computer 110 memory and a type of a target 200 $t_1 \ldots t_n$. Such table may include factor $\mu$ values, e.g., 0 (zero) for vehicles, 1 for trucks, and 2 for pedestrians. In this example, a greater value (e.g., 2) of $\mu$ for a pedestrian target 200 compared to smaller value (e.g., 1) for a vehicle target 200 results in a vehicle 105 maintaining a greater distance to a pedestrian target 200. The computer 110 may be programmed to identify the type of a target 200 based on received sensor 130 data, e.g., camera image data, using image processing techniques, and determine the factor $\mu_j$ of target $t_j$ based on the data stored in the memory and the identified type of the target $t_j$, e.g., determining a factor $\mu_j$ value 1 for a target 200 $t_j$ upon determining that the target 200 $t_j$ is a pedestrian. Additionally or alternatively, the computer 110 may be programmed to determine the factor $\mu_j$ based on a speed of the target $t_j$, e.g., increasing the factor $\mu_j$ of the target $t_j$ proportionally based on the target $t_j$ speed.

The computer 110 may be programmed to determine a planned path 240 based on equation (1), i.e., such that the equation (1) is satisfied (i.e., the distance $d_{ij}$ is greater than or equal zero). The targets $t_1 \ldots t_n$ may be targets detected by vehicle 100 object detection sensors 130.

In one example, in absence of any target 200 in an area 260, the computer 110 may be programmed to determine an obstacle-free acceleration $u_{h0}$ based on location coordinates of the destination 220, map data, etc. The acceleration $u_{h0}$ is typically a two-dimensional vector including a longitudinal acceleration $a_x$ and a lateral acceleration $a_y$, as shown in equation (2).

$$u_{h0}=[a_x, a_y] \qquad (2)$$

However, upon presence of a set $t_1 \ldots t_n$ of targets 200 in an area 260, each moving to their respective destinations 230, the accelerations $u_h$ of the vehicle 100 planned to maintain distances $d_{ij}$ from the targets $t_1 \ldots t_n$ may differ from the obstacle-free planned accelerations $u_{h0}$. In one example, the computer 110 may be programmed, according to Equation (3), to determine acceleration vector $[u_h^*, u_{t_1}^*, \ldots, u_{t_n}^*]$ for the vehicle 100 and a set $t_1 \ldots t_n$ of targets 200. Equation (4) shows a constraint for identifying paths 240, 250 for the vehicle 100 and a set $t_1 \ldots t_n$ of targets 200. Parameters $l_0$ and $l_1$ are selected such that the roots of a polynomial $\lambda^2+l_1\lambda+l_0$ are real numbers. Equations (3)-(4) each take the form of a Quadratic Programming (QP) problem that can be solved by various existing algorithms.

$$[u_h^*, u_{t_1}^*, \ldots, u_{t_n}^*] = \arg\min_{u_h, u_{t_i}} \left( \|u_h - u_{h0}\|^2 + \sum_{i=1}^{n} \|u_{t_i}\|^2 \right) \qquad (3)$$

-continued $$\ddot{d}_{ij} + l_1 \dot{d}_{ij} + l_0 d_{ij} = \tag{4}$$
$$2v_\Delta^T v_\Delta + 2X_\Delta^T(u_i - u_j) + 2l_1 X_\Delta^T v_\Delta + l_0 h(X\_\Delta) \geq 0 \; i \in \{h, t_1, \ldots t_n\},$$

$$j \in \{t_1, \ldots t_n\} i \neq j$$

where $X_\Delta^T$ is the difference between (x, y) coordinates of the objects i and j, and $v_\Delta$ is a difference between the respective velocities.

With respect to equation (3), the arg min operation determines input arguments of a function that result in a minimum value as output from the function. In other words, arg min identifies among all possible $u_h$, $u_{t_1}$, ..., $u_{t_n}$ (i.e., values satisfying equation (4)), the accelerations $u_h^*$, $u_{t_1}^*$, ..., $u_{t_n}^*$ which include the planned acceleration $u_h$ of the vehicle 100 and estimated accelerations $u_{t_1}^*$, ..., $u_{t_n}^*$ of targets 200 $t_1$, ..., $t_n$. The computational problem posed by equations (3) and (4) is in the standard Quadratic Programming format and can be solved efficiently using existing tools in a relatively short period of time (microseconds to milliseconds).

A planned acceleration $u_{ti}$ a target 200 may not be communicated or provided to a vehicle 100, e.g., by vehicle-to-vehicle communications from the target 200; therefore, a vehicle 100 computer 110 will not be provided with planned acceleration(s) $u_{ti}$ of targets 200, nor the obstacle free acceleration $u_{t_i0}$ the target i would have used if there was no interference with other vehicle(s) 100 and/or target(s) 200. If the latter were known for some or all the targets 200, then equation (3) may be modified by changing $\Sigma_{i=1}^{n}\|u_{t_i}\|^2$ to $\Sigma_{i=1}^{n}\|u_{t_i}-u_{t_i0}\|^2$. Thus, by solving (3) and (4), together with the host vehicle 100 acceleration $u_h$, the computer 110 may determine accelerations $u_{t_1}$, ..., $u_{t_n}$ of respective members $t_1$, ..., $t_n$ of a set of targets 200, where the respective accelerations satisfy equation (4). The solution is denoted by $u_h^*$, $u_{t_1}^*$, ..., $u_{t_n}^*$. Further, the computer 110 can determine a planned acceleration $u_h$ of the vehicle 100 based on the determined accelerations $u_{t_1}$, ..., $u_{t_n}$ of the targets $t_1$ ... $t_n$, and obstacle-free planned acceleration $u_{h0}$.

The computer 110 may be programmed to actuate one or more vehicle 100 actuators 120, e.g., brake, propulsion, and/or steering actuators 120, based on a planned acceleration $u_h$.

The computer 110 implements a planned acceleration $u_h$ by actuating the vehicle 100 actuators 120 based on an assumption that the targets 200 in a set $t_1$, ..., $t_n$ will navigate, i.e., move, based on estimated accelerations $u_{t_1}^*$, ..., $u_{t_n}^*$. Actual acceleration $a_{ti}$ of respective targets in the set $t_1$, ..., $t_n$ may differ from accelerations $u_{ti}$ estimated by the vehicle 100. In other words, one or more of the targets in a set $t_1$, ..., $t_n$ may operate unexpectedly or irrationally, e.g., accelerate differently from predicted accelerations $u_{t_1}^*$, ..., $u_{t_n}^*$. In the present context, the targets which operate close to what is expected are referred to as "cooperative targets," whereas the targets which operate unexpectedly are referred to as "non-cooperative" targets. Herein, "unexpected operation" in the present context means operating a target with a physical magnitude, e.g., speed, acceleration, etc., that deviates from the estimated value by at least a specified deviation threshold, e.g., 10%. For example, a target 200 may be considered as non-cooperative when a speed or acceleration of the target 200 deviates by at least a threshold, e.g., 10% (e.g., a deviation as defined with reference to equation (6) below) relative to a speed or acceleration estimated by the vehicle 100 for the respective target 200.

Herein, two example solutions are described regarding how the vehicle 100 computer 110 can adjust vehicle 100 operation upon detecting non-cooperative target(s) 200. In a first example, the thresholds 205 are adjusted upon detecting non-cooperative target(s) 200. For example, the computer 110 may be programmed to adjust a threshold 205 based on a difference between the actual acceleration $a_{ti}$ of the target 200 and the predicted optimal acceleration $u_{ti}$, and to adjust the planned acceleration $u_h$ (i.e., resulting in a revised path 280) based at least in part on the adjusted threshold 205.

An adjustment of threshold(s) 205 may be implemented by adjusting the factor μ, discussed above. Thus, upon detecting non-cooperative target(s) 200, the factor μ associated with the non-cooperative target(s) 200 may be increased. Additionally, upon determining that a non-cooperative target 200 assumes or resumes an expected behavior (i.e., becomes a cooperative target 200), the factor μ associated with the respective target 200 may be reduced, i.e., resulting in a reduction of the threshold distance 205 of the respective target 200.

The computer 110 may be programmed to determine a norm of a difference of the actual acceleration relative to the estimated acceleration of a target 200, to apply a filter to the determined difference (i.e., outputting a filtered norm), and to determine the factor μ based on the output of the filter. In the present context, a "norm" (or Euclidean norm) of a two-dimensional vector V, with respect to equation (5), is a square root of the sum of the squared vector values x, y.

$$\|V\| = \sqrt{x^2 + y^2} \text{ where } V = [x, y] \tag{5}$$

With reference to equation (6), the computer 110 may be programmed to determine the norm of an acceleration difference $$d_{\mathit{diff}_{t_i}}$$

for each target $t_i$ between the optimal acceleration $u_{ti}^*$ (computed by the vehicle 100) and an actual acceleration $a_{ti}$ of a respective target 200 $t_i$.

$$d_{\mathit{diff}_{t_i}} = \|a_{ti} - u_{ti}^*\| \tag{6}$$

The computer 110 may be further programmed to apply a filter, e.g., a first order low-pass filter, to the acceleration difference $$a_{\mathit{diff}_{t_i}}.$$

A first order low-pass filter is a filter that passes signals with a frequency lower than a selected cutoff frequency and weakens (or stops) signals with frequencies higher than the cutoff frequency. A low-pass filter may be specified by a short and a long time constant. In one example, the first order filter may have a short time constant in an increasing direction (i.e., quickly reacting to non-cooperative targets) and a long time constant in the decreasing direction (i.e., slowly reacting to a non-cooperative target that turns into being a cooperative target). Upon filtering the acceleration difference $$a_{\mathit{diff}_{t_i}},$$

the computer 110 may be programmed, according to equations (7)-(8), to adjust the factor $\mu_i$. In one example, parameters $b_1$, $b_2$, c, and M may be 0.2, 7, 0.3, and 30.

$$\zeta = \begin{cases} \max\{0, b_2(a_{\mathit{diff}_{t_i}} - \zeta)\} & \text{if } \zeta \leq 0.05/c \\ \max\{\min\{0, b_1(a_{\mathit{diff}_{t_i}} - \zeta)\}, b_2(a_{\mathit{diff}_{t_i}} - \zeta)\} & \text{otherwise} \\ \min\{0, b_1(a_{\mathit{diff}_{t_i}} - \zeta)\} & \text{if } \zeta \geq M/c \end{cases} \quad (7)$$

$$\mu_i = \sqrt{1 + c\zeta/r^2} - 1 \quad (8)$$

In one example, each of the vehicle 100 and targets 200 $t_1, \ldots, t_n$ may be programmed according to equations (7)-(8) to adjust the factor $\mu_i$ for other traffic objects. In this example, upon determining that target 200 $t_2$ is non-cooperative, then not only the vehicle 100 may adjust the factor $\mu_2$ for the target 200 $t_2$, but also other targets 200 $t_1$, $t_3, \ldots, t_n$ may be programmed to adjust a threshold 205 associated with the target 200 $t_2$.

In addition to adjusting threshold(s) 205 (as discussed above) or as an alternative, the acceleration difference $$a_{\mathit{diff}_{t_i}}$$

may alternatively be used as a disturbance input that modifies the planed path 240. That is, the computer 110 may be programmed to revise the planned acceleration $u_h$ based on the acceleration difference $$a_{\mathit{diff}_{t_i}}$$

between the actual acceleration $a_{t_i}$ of the target 200 $t_i$ and the optimal acceleration $u_{t_i}$ or the target 200 $t_i$.

Figure 3:
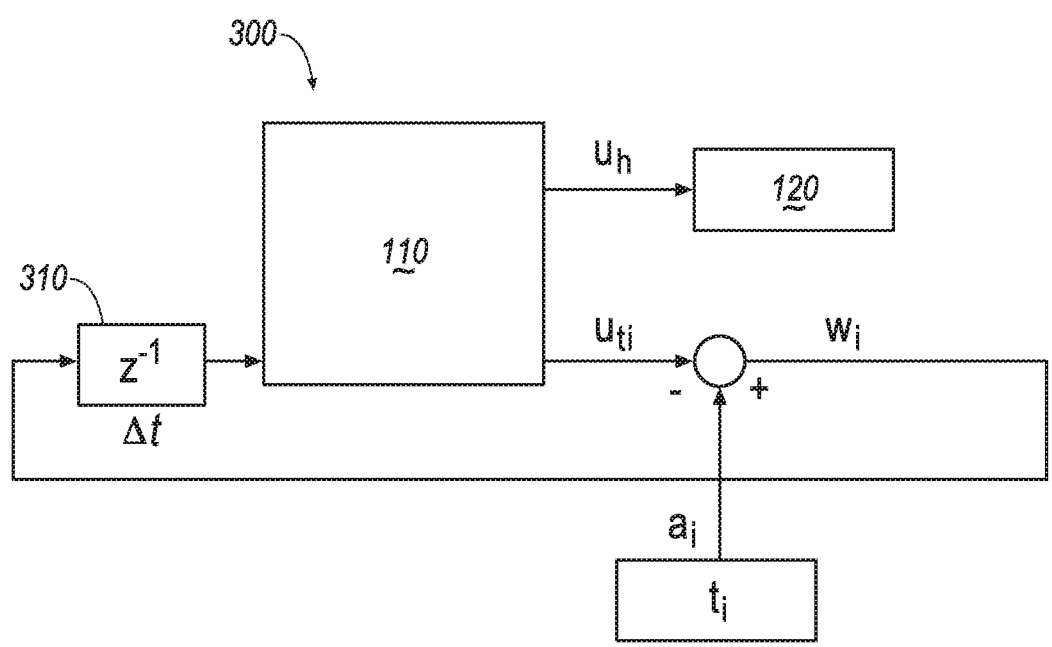
FIG. 3 is an exemplary block diagram for controlling vehicle operation based on target navigation.

FIG. 3 illustrates an example block diagram of a control loop 300 for operating the vehicle 100. For example, the computer 110 may be programmed based on the control loop 300 to operate the vehicle 100. The computer 110 may be programmed to actuate the vehicle 100 actuator(s) 120 based on the planned path 240, e.g., by outputting a planned acceleration $u_h$ to the actuator(s) 120. Here should be noted that the planned acceleration $u_h$ is a two-dimensional vector ((x, y) or longitudinal and lateral acceleration). Thus, the steering actuator 120 of the vehicle 100 may be additionally actuated based on the planned acceleration $u_h$.

As discussed above, the computer 110 may be programmed to determine optimal path(s) 250, e.g., including estimated optimal acceleration(s) $u_{t_i}$, for one or more target(s) 200 $t_i$. Additionally, the computer 110 may be programmed to determine an actual acceleration at of the target(s) 200 $t_i$ based on data received from the vehicle 100 sensors 130, e.g., object detection sensors 130, speed sensor 130, acceleration sensor 130, yaw rate sensor 130. For example, the computer 110 may be programmed to estimate acceleration(s) $a_{t_i}$ of the target(s) 200 $t_i$ based on the received vehicle 100 sensor 130 data using image processing techniques. Thus, the actual acceleration $a_{t_i}$ may be determined based on the vehicle 100 sensor(s) 130 data.

With reference to equation (9), the computer 110 may be programmed to determine disturbance inputs $w_i$ based on the optimal acceleration(s) $u_{t_i}$. As discussed above, the computer 110 determines an optimal acceleration $u_{t_i}$ of a target 200 $t_i$, and, based on data received from the vehicle 100 sensor 130, may determine an actual (or observed) acceleration $a_{t_i}$. Therefore, the control loop 300 shows a delay block 310 that may delay the disturbance data $w_i$ for one computation step $\Delta t$, e.g., 50 milliseconds (ms).

$$w_i = a_{t_i} - u_{t_i} \quad (9)$$

As discussed above, the computer 110 may be programmed, based on equation (4), to determine a planned acceleration $u_h$ of the vehicle 100. In this example, the computer 110 may be programmed further based on equation (9) to determine the planned path 240 at least in part on the disturbance $w_i$. In one example, the computer 110 may be programmed to compute the planned acceleration $u_h$ based on a sum of estimated acceleration $u_{t_i}$ of the target 200 $t_i$ and the determined disturbance $w_i$. Thus, the computer 110 may compute a revised acceleration $u_h$ by taking into account the disturbance $w_i$ that is determined by observing the target $t_i$. In one embodiment, the disturbances $w_i$ are added to the target accelerations to the modified Equation (4): $\ddot{d}_{ij} + l_1 \dot{d}_{ij} + l_0 d_{ij} = 2v_A^T v_A + 2X_A^T(u_i + w_i - u_j - w_j) + 2l_1 X_A^T v_A + l_0 h(X_A) \geq 0$ $i \in \{h, t_1, \ldots, t_n\}$, $j \in \{t_1, \ldots, t_n\}$ $i \neq j$. Note that $w_h$ is not used as it would be equal 0 (zero). An optimal computed acceleration $u_{t_i}$ may be determined by the host vehicle 100 computer 110. In the present context, "observing" means receiving sensor 130 data and determining the actual acceleration $a_{t_i}$ of the target $t_i$. Additionally, "observing" may mean receiving location and/or path data of the target t via a wireless communication network.

Figure 4:
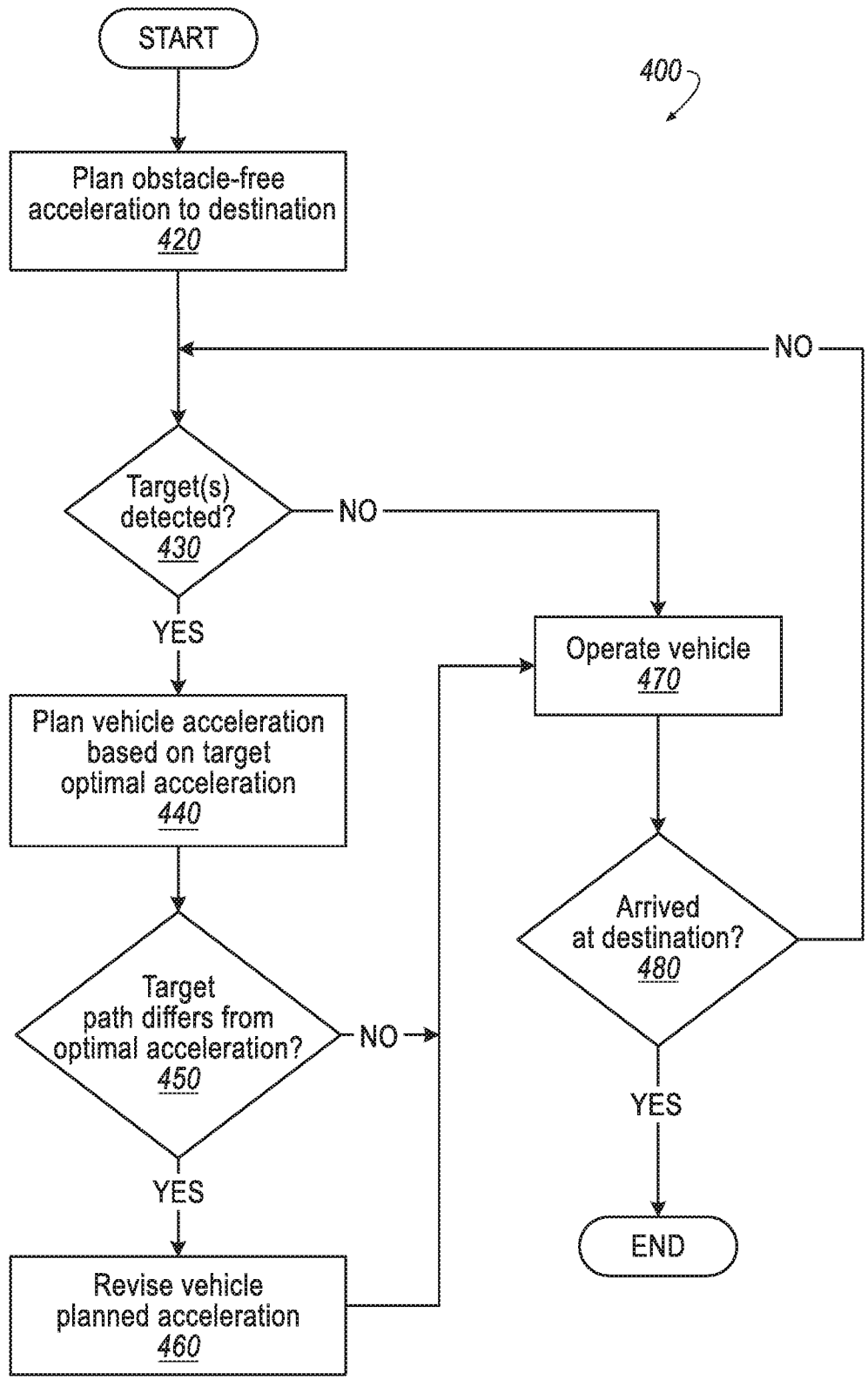
FIG. 4 is a flowchart of an exemplary process for navigating the vehicle.

FIG. 4 is a flowchart of an exemplary process 400 for navigating the vehicle 100. The vehicle 100 computer 110 may be programmed to execute blocks of the process 400.

The process 400 begins in a block 420, in which the computer 110 plans an obstacle-free acceleration $u_{h0}$ within an area 260 to a specified location, e.g., an interim/final destination 220 of a vehicle 100, i.e., assuming no targets are in vehicle 100 path to the destination 220.

Next, in a decision block 430, the computer 110 determines whether a target 200 is detected within the area 260. The computer 110 may be programmed to detect a target 200 based on data received from vehicle 100 object detection sensor(s) 130 and/or data received via a wireless communication network including location and/or path of one or more targets 200 within an area 260. If the computer 110 detects one or more targets 200 within the area 260, then the process 400 proceeds to a block 440; otherwise the process 400 proceeds to a block 470.

In the block 440, the computer 110 determines a planned acceleration $u_h$ for the vehicle 100 and estimates optimal accelerations $u_{t_1}^*, \ldots, u_{t_n}^*$ for each of the one or more targets 200 in a set $t_1, \ldots, t_n$. The computer 110 may be programmed based on equations (1)-(4) above. Advantageously, the computer 110 may estimate the optimal accelerations(s) $u_{t_1}^*, \ldots, u_{t_n}^*$ even without receiving data from the respective target(s) $t_1, \ldots, t_n$. For example, the computer 110 may estimate the optimal acceleration(s) $u_{t_1}^*, \ldots, u_{t_n}^*$ based at least in part on anticipated cooperation rules such as described above, e.g., with reference to Table 1.

Next, in a decision block 450, the computer 110 determines whether one or more target(s) $t_i$ is detected with an actual acceleration $a_{t_i}$ that differs from the respective optimal acceleration $u_{t_i}^*$. Additionally or alternatively, the computer 110 may be programmed to detect an actual change in velocity over a prescribed (short) interval differing from the optimal one obtained by integrating the respective optimal acceleration. Additionally or alternatively, the computer 110 may be programmed to determine an actual acceleration by determining an actual change in position of a target 200 versus an expected determined based on optimal acceleration. In other words, the computer 110 determines whether a non-cooperative target $t_i$ is detected. As discussed above, the computer 110 may be programmed to determine the actual accelerations(s) $a_{ti}$ based at least in part on vehicle 100 sensor 130 data. If the computer 110 determines that one or more targets $t_i$ acceleration $a_{ti}$ differs from the optimal acceleration $u_{ti}$ (e.g., by at least a minimum threshold, as discussed above), then the process 400 proceeds to a block 460; otherwise the process 400 proceeds to the block 470.

In the block 460, the computer 110 revises the optimal acceleration $u_{t_i}^*$ (e.g., determining a revised path 280 with respect to FIGS. 2B-2C). The computer 110 may further revise the optimal accelerations $u_{t_1}^*, \ldots, u_{t_n}^*$ of targets 200 $t_1, \ldots, t_n$ based on the determined actual acceleration $a_{ti}$. In one example, the computer 110 may be programmed, based on equations (6)-(8) above, to adjust the thresholds 205 by adjusting the factor μ, and to revise the planned acceleration $u_h$ and the optimal acceleration $u_{t_1}^*, \ldots, u_{t_n}^*$ based on the adjusted factor μ. In another example, the computer 110 may be programmed, with reference to the example control loop 300 of FIG. 3 and equation (9) above, to determine disturbance input(s) $w_i$ based on the estimated acceleration(s) $u_{ti}$ and the determined actual acceleration(s) $a_{ti}$, and to revise the planned acceleration $u_h$ and optimal accelerations $u_{t_1}, \ldots, u_{t_n}^*$ based on the determined disturbance input $w_i$. Following the block 460, the process 400 proceeds to the block 470.

In the block 470, which can be reached from any of the blocks 430, 450, 460, the computer 110 operates the vehicle 100 based on the planned obstacle-free acceleration $u_{h0}$ (when reached from the decision block 430) or the planned acceleration $u_h$ (when reached from either of the blocks 450, 460). The computer 110 may be programmed to actuate the vehicle 100 braking, steering, and/or propulsion actuators 120 based on the planned acceleration $u_h$.

Next, in a decision block 480, the computer 110 determines whether the vehicle 100 arrived at the destination. For example, the computer 110 may be programmed to determine that that the vehicle 100 arrived at the destination, upon determining that a vehicle 100 location is within a specified threshold, e.g., 5 meters, of the specified location coordinates (e.g., GPS coordinates) of the destination. If the computer 110 determines that the vehicle 100 arrived at the specified destination, then the process ends, or alternatively returns to the block 410, although not shown in FIG. 4; otherwise the process 400 returns to the decision block 430.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
 determining a planned acceleration of a vehicle and a predicted acceleration of a target;
 adjusting a threshold based on a difference between an actual acceleration of the target and the predicted acceleration of the target, wherein the threshold is at least in part defined by a type of the target, a circle centered at a reference point of the target with a specified safety radius, and a second circle centered along a longitudinal axis of the target;
 determining a safety factor for the target based on the type of the target and a speed of the target and adjusting the safety radius based on the determined safety factor, wherein determining the safety factor includes applying a low-pass filter to an acceleration difference between the actual acceleration of the target and the predicted acceleration, wherein the low-pass filter has a first time constant in an increasing direction and a second time constant longer than the first time constant in a decreasing direction, and then adjusting the safety factor based on the filtered acceleration difference;

upon determining that the actual acceleration of the target differs from the predicted acceleration of the target, revising the planned acceleration of the vehicle based on the actual acceleration of the target and the adjusted threshold; and actuating a vehicle actuator based on the revised planned acceleration of the vehicle.

2. The method of claim 1, wherein the target is a pedestrian or a second vehicle.

3. The method of claim 1, wherein the planned acceleration of the vehicle and the predicted acceleration of the target each include at least one of a direction and a physical magnitude.

4. The method of claim 1, wherein determining the planned acceleration of the vehicle and the predicted acceleration of the target is based on the target satisfying one or more specified rules.

5. The method of claim 1, wherein revising the planned acceleration further includes determining an acceleration difference between the actual acceleration of the target and the predicted acceleration.

6. The method of claim 1, further comprising: detecting a second target; predicting a second target acceleration; and based on (i) the actual acceleration of the target relative to the predicted target acceleration, (ii) a second target actual acceleration relative to the predicted second target acceleration, (iii) the threshold around the target, and (iv) a second threshold around the second target, adjusting the planned acceleration.

7. A system, comprising a processor and a memory, the memory storing instructions executable by the processor to:

determine a planned acceleration of a vehicle and a predicted acceleration of a target;

adjust a threshold based on a difference between an actual acceleration of the target and the predicted acceleration of the target, wherein the threshold is at least in part defined by a type of the target, a circle centered at a reference point of the target with a specified safety radius, a second circle centered along a longitudinal axis of the target;

determine a safety factor for the target based on the type of the target and a speed of the target and adjust the safety radius based on the determined safety factor, wherein determining the safety factor includes applying a low-pass filter to an acceleration difference between the actual acceleration of the target and the predicted acceleration, wherein the low-pass filter has a first time constant in an increasing direction and a second time constant longer than the first time constant in a decreasing direction, and then adjust the safety factor based on the filtered acceleration difference;

upon determining that the actual acceleration of the target differs from the predicted acceleration of the target, revise the planned acceleration of the vehicle based on the actual acceleration of the target and the adjusted threshold; and actuate a vehicle actuator based on the revised planned acceleration of the vehicle.

8. The system of claim 7, wherein the target is a pedestrian or a second vehicle.

9. The system of claim 7, wherein the planned acceleration of the vehicle and the predicted acceleration of the target each include at least one of a direction and a physical magnitude.

10. The system of claim 7, wherein the instructions to revise the planned acceleration further include instructions to determine a difference between the actual acceleration of the target and the predicted acceleration.

11. The system of claim 7, wherein the instructions include further instructions to: detect a second target; predict a second target acceleration; and based on (i) the actual acceleration of the target relative to the predicted target acceleration, (ii) a second target actual acceleration relative to the predicted second target acceleration, (iii) the threshold around the target, and (iv) a second threshold around the second target, adjust the planned acceleration.

* * * * *